United States Patent
Carelli et al.

(10) Patent No.: US 8,967,254 B2
(45) Date of Patent: Mar. 3, 2015

(54) AQUEOUS RESIN COMPOSITIONS AND METHODS FOR CEMENT REPAIR

(75) Inventors: Clara Carelli, Cambridge (GB); Sylvaine Le Roy-Delage, Paris (FR)

(73) Assignee: Schlumberger Technology Corporation, Sugar Land, TX (US)

(*) Notice: Subject to any disclaimer, the term of this patent is extended or adjusted under 35 U.S.C. 154(b) by 1040 days.

(21) Appl. No.: 12/622,023

(22) Filed: Nov. 19, 2009

(65) Prior Publication Data

US 2010/0137473 A1 Jun. 3, 2010

(30) Foreign Application Priority Data

Nov. 27, 2008 (EP) .................................... 08170062

(51) Int. Cl.
| | | |
|---|---|---|
| C09K 8/00 | (2006.01) | |
| C09K 8/42 | (2006.01) | |
| C09K 8/44 | (2006.01) | |
| C04B 26/14 | (2006.01) | |
| C09D 5/34 | (2006.01) | |
| C09D 163/00 | (2006.01) | |
| C04B 111/00 | (2006.01) | |

(52) U.S. Cl.
CPC . *C09K 8/44* (2013.01); *C09K 8/428* (2013.01); C04B 2111/00663 (2013.01); *C04B 26/14* (2013.01); *C09D 5/34* (2013.01); *C09D 163/00* (2013.01)
USPC ............................ 166/277; 166/300; 523/130

(58) Field of Classification Search
CPC .... C04B 26/14; C04B 20/0024; C04B 24/06; C04B 2111/0063; C04B 2103/0049; C04B 2103/0094; C09D 5/34; C09D 163/00; C09K 8/428; C09K 8/44
USPC ........................................................... 523/130
See application file for complete search history.

(56) References Cited

U.S. PATENT DOCUMENTS

| | | | | |
|---|---|---|---|---|
| 4,486,316 A | * | 12/1984 | Carriere et al. | ................ 507/119 |
| 4,493,777 A | * | 1/1985 | Snyder et al. | ................ 508/472 |
| 5,101,900 A | | 4/1992 | Dees | |
| 5,127,473 A | * | 7/1992 | Harris et al. | ................ 166/277 |
| 5,178,218 A | | 1/1993 | Dees | |

(Continued)

FOREIGN PATENT DOCUMENTS

| | | |
|---|---|---|
| EP | 266043 | 5/1988 |
| WO | 0005302 | 2/2000 |

(Continued)

OTHER PUBLICATIONS

Synthomer: "Building Products: Cement & Membranes Product Selector" Internet Article, [Online] Nov. 2004, XP002525720.

*Primary Examiner* — Mark Eashoo
*Assistant Examiner* — David Karst
(74) *Attorney, Agent, or Firm* — Michael Dae

(57) ABSTRACT

A composition for repairing voids or cracks in a cement sheath or plug comprises an aqueous epoxy resin, a hardener, an alkali-swellable material and an aqueous carrier fluid. The particle size of the alkali-swellable material is preferably smaller than 200 nanometers, thereby allowing the composition to penetrate cracks as small as 60 micrometers. A method for repairing voids or cracks in a cement sheath, thereby restoring zonal isolation, comprises preparing the composition, injecting the composition into voids or cracks in a cement sheath or plug and allowing the composition to viscosify and harden.

14 Claims, 4 Drawing Sheets

(56) References Cited

U.S. PATENT DOCUMENTS

| | | |
|---|---|---|
| 5,377,757 A | 1/1995 | Ng |
| 5,547,027 A | 8/1996 | Chan et al. |
| 5,839,510 A | 11/1998 | Weaver et al. |
| 6,503,870 B2 * | 1/2003 | Griffith et al. ............... 507/219 |
| 6,739,392 B2 | 5/2004 | Cook et al. |
| 6,802,375 B2 | 10/2004 | Bosma et al. |
| 7,114,570 B2 | 10/2006 | Nguyen et al. |
| 7,135,231 B1 | 11/2006 | Sinclair et al. |
| 2006/0234871 A1 | 10/2006 | Dalrymple et al. |
| 2006/0258546 A1 | 11/2006 | Brannon et al. |
| 2007/0021309 A1 | 1/2007 | Bicerano |
| 2007/0023187 A1 | 2/2007 | Canova et al. |
| 2007/0111901 A1 * | 5/2007 | Reddy et al. ............... 507/221 |
| 2007/0160755 A1 | 7/2007 | Zaid |
| 2007/0203028 A1 | 8/2007 | Lewis et al. |
| 2007/0224362 A1 | 9/2007 | Briand et al. |
| 2007/0293402 A1 | 12/2007 | Ballard |
| 2008/0023205 A1 | 1/2008 | Craster et al. |
| 2008/0110623 A1 | 5/2008 | Brannon et al. |
| 2008/0190615 A1 * | 8/2008 | Drochon ............... 166/295 |

FOREIGN PATENT DOCUMENTS

| | | |
|---|---|---|
| WO | 0190531 | 11/2001 |
| WO | 0226656 | 4/2002 |
| WO | 0246574 | 6/2002 |
| WO | 2004022914 | 3/2004 |
| WO | 2006061561 | 6/2006 |
| WO | 2007/083109 | 7/2007 |
| WO | 2007083109 | 7/2007 |
| WO | 2007/089913 | 8/2007 |
| WO | 2007089913 | 8/2007 |
| WO | 2007091007 | 8/2007 |

* cited by examiner

AQUEOUS RESIN COMPOSITIONS AND METHODS FOR CEMENT REPAIR

BACKGROUND OF THE INVENTION

The statements in this section merely provide background information related to the present disclosure and may not constitute prior art.

This invention relates to compositions and methods for restoring zonal isolation in downhole environments, and more particularly to repairing faults in cement sheaths in order to restore zonal isolation. The invention finds particular application in wells of the type used in the oil and gas industry.

Squeeze or remedial cementing is a common operation in the petroleum industry and is used to address incomplete zonal isolation in oil and gas wells. Incomplete zonal isolation can arise from cracks, voids and channels resulting from improper primary cement job design or execution, and/or stresses applied to the set cement in the annulus arising from pressure and temperature changes during the well life.

Traditionally, formulations comprising Portland cements such as API/ISO Class A or H are employed in remedial-cementing operations. However, situations frequently arise in which the cement particles are too large to enter the cracks, voids and channels. In these cases the remedial treatments are unsuccessful. These problems are more thoroughly discussed in the following publication: Daccord G et al.: "Remedial Cementing," in Nelson EB and Guillot D (eds.): Well Cementing, $2^{nd}$ Edition, Houston: Schlumberger (2006) 503-547.

Too address these problems, microcement systems have been developed to repair cracks and other voids in cement sheaths. Special formulations with microcements having optimized particle size distributions are able to penetrate cracks with widths as low as approximately 100 micrometers. While this advance has improved the general success rate of remedial cementing operations, situations continue to arise during which even microcement particles are too large, and slurries containing them are ineffective. As a result, a need remains for compositions capable of entering and sealing cracks, voids or channels smaller than 100 micrometers.

Epoxy resins are thermosetting polymers that cure (polymerize and crosslink) when mixed with a catalyzing agent or "hardener. Most common epoxy resins are produced from a reaction between epichlorohydrin and bisphenol-A. The applications for epoxy-based materials are extensive and include coatings, adhesives and composite materials. The chemistry of epoxies allows the production of resins with a very broad range of properties. In general, epoxies are known for their excellent adhesion, good mechanical properties, and chemical and heat resistance.

In oilfield and downhole environments, epoxy resins have been used for many different applications. Applications include coatings for proppants and other particulate materials (for example in US20070293402A1, US20070160755A1, U.S. Pat. No. 7,135,231B1, US20070023187A1, US20080110623A1, US20060258546A1, WO2000005302A1 and WO2002026656A1), sand control (WO2007091007A1, U.S. Pat. No. 5,178,218A, U.S. Pat. No. 5,101,900A), formation consolidation (U.S. Pat. No. 5,839,510A, U.S. Pat. No. 7,114,570B2, WO2002046574A1, WO2004022914A1, EP266043B1) and drilling (US20070021309A1, U.S. Pat. No. 6,739,392B2).

Other documents describe the use of epoxy resins in the context of zonal isolation (U.S. Pat. No. 5,547,027A, US20080023205A1 and WO2001090531A1, U.S. Pat. No. 5,377,757A, US20060234871A1, and U.S. Pat. No. 6,802,375B2). Although such materials can solve some of the problems encountered with traditional cement sealants, they present some drawbacks. In U.S. Pat. No. 5,547,027A, solvent-based resins are used, and a preflush may be required to obtain an adequate bond. This can be costly, time consuming and difficult from an operational point of view. In other patents, aqueous or water-compatible epoxy resins are employed to repair or plug openings. In these cases, in which the well temperature affects the curing of the resin, controlling the rheological properties and the setting time can be difficult.

The present invention overcomes the aforementioned problems associated with conventional Portland cement and microcement systems, and also addresses the difficulties that have arisen with other uses of epoxy resins for achieving zonal isolation.

SUMMARY OF THE INVENTION

A first aspect of the invention provides a composition for use as a sealant to repair cement in wellbores, comprising: an aqueous epoxy resin; a hardener; an alkali-swellable material [e.g., an alkali-swellable latex (hereinafter given the acronym "ASL") or hydrogel]; and an aqueous carrier fluid.

Preferably, the composition further comprises a pH buffer (e.g., citric acid) to control the pH of the composition.

The amount of aqueous carrier fluid may be varied to provide a composition having desired rheological properties. The preferred viscosity of the composition is below 50 cP, more preferably below 30 cP and most preferably below 20 cP.

The ASL preferably has an average particle size of less than about 600 nanometers, more preferably less than 400 nanometers and most preferably less than 200 nanometers. Additionally, the ASL preferably comprises polymer chains containing acid groups.

The aqueous epoxy resin comprises a bisphenol A novalac resin, and the hardener comprises an amine hardener.

It is preferred that the alkali swellable material comprises 30-70% by weight of the composition, more preferably 40-50% by weight of the composition. It is preferred that the epoxy resin comprises 4-20% by weight of the composition, more preferably 8-12% by weight. It is preferred that the hardener comprises 3-20% by weight of the composition, more preferably 8-12% by weight. It is preferred that the citric acid solution comprises 2-20% by weight of the composition, more preferably 10-12% by weight. It is preferred that the aqueous carrier fluid comprises 20-30% by weight of the composition, more preferably about 24% by weight.

It is particularly preferred that the composition be formulated so that it can be injected into a channel or crack narrower than 100 micrometers. It is even more particularly preferred that the composition be formulated so that it can be injected into a channel or crack narrower than 60 micrometers.

In a second aspect, the invention provides a method of repairing faults or cracks in cement sheaths or plugs, comprising the following steps. The first step is to prepare a composition that comprises an aqueous epoxy resin, a hardener, an alkali-swellable material and an aqueous carrier fluid. Second, the composition is injected into a crack or fault the cement. Third, the composition is allowed to viscosify and harden, thereby restoring zonal isolation.

It is preferred that the alkali-swellable material in the composition swells on contact with the cement, thereby increasing the viscosity of the composition inside the crack in the cement.

BRIEF DESCRIPTION OF THE DRAWINGS

For a more complete understanding of the present invention, and the advantages thereof, reference is now made to the following descriptions taken in conjunction with the accompanying figures.

DETAILED DESCRIPTION

Figure 1:
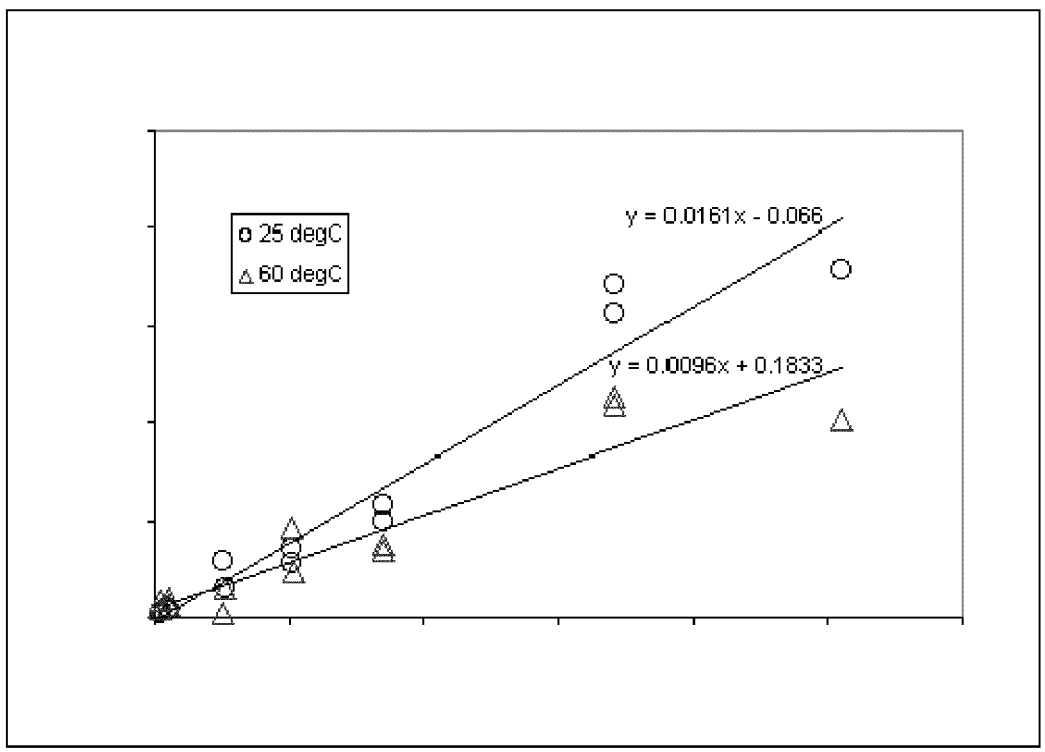
FIGS. 1 and 2 are plots that show shear stress as a function of shear rate at two different temperatures for two formulations according to the invention.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be time consuming but would nevertheless be a routine undertaking for those of ordinary skill in the art having the benefit of this disclosure. In addition, the compositions used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range. Further aspects of the invention will be apparent from the following description.

The first aspect of the invention provides a composition for use as a sealant to repair cement in wellbores, comprising: an aqueous epoxy resin; a hardener; an alkali-swellable material (for example an ASL or hydrogel); and an aqueous carrier fluid.

Preferably, the composition further comprises a pH buffer, for example citric acid, to control the pH of the composition.

The amount of aqueous carrier fluid may be varied to provide a composition having desired rheological properties. The preferred viscosity of the composition is below 50 cP, more preferably below 30 cP and most preferably below 20 cP.

The aqueous epoxy resin comprises a bisphenol A novalac resin, and the hardener comprises an amine hardener. The aqueous epoxy resins of the invention present several advantages. They are compatible with other aqueous systems and easy to clean up with water. Moreover, they are stable if no evaporation of water occurs, and their viscosity can be adjusted by adding water.

As epoxies are well known for their corrosion resistance, high compressive- and shear-bond strength, their compatibility with strong acids and bases and their resistance to hydrocarbons and alcohols. Their presence can improve the sealing properties of a formulation considerably.

A wide variety of epoxy resins and hardeners may be used. A particularly suitable resin is commercially available from Hexion Specialty Chemicals under the trade designation "EPI-REZ-5003-W-55". This aqueous dispersion includes a bisphenol A novalac resin that contains 1 gram equivalent of epoxide for 205 grams of resin. Depending on the temperature, this resin can be formulated with different hardeners. The commercially available hardener under the trade name Epikure 6870-W-53, a tertiary amine, may be used at temperatures up to 100° C., while formulations containing Epikure 3253 and Epikure 921S (DICY) are suitable for higher temperatures.

In the formulation of this invention an alkali swellable material, preferably an ASL, is combined with the epoxy resin. ASLs are polymeric fluids containing acid groups in the polymer chains and which have a well-controlled particle size distribution (preferably smaller than 200 nanometers), and low viscosity. Addition of alkali to the ASL results in neutralization of the acid groups, generating an anionic charge at the acid sites along the polymer chain. The like charges repel one another resulting in swelling and uncoiling of the polymer. This extremely large increase in the volume of the neutralized polymer is responsible for a significant build-up of compound viscosity, at relatively low polymer concentration.

Without limitation, examples of suitable commercially available ASLs include TYCHEM 68710-00 from Dow Chemical; ACRYSOL U 615 from Rohm and Hans; ALCOGUM SL-120, SL920 from Alco Chemical, a National Starch Company; VISCALEX HV30 from Ciba Specialty Chemicals, Latekoll DS from BASF; and SYNTHOMER 9523 from SYNTHOMER.

It is preferred that the alkali swellable material comprises 30-70% by weight of the composition, more preferably 40-50% by weight of the composition. It is preferred that the epoxy resin comprises 4-20% by weight of the composition, more preferably 8-12% by weight. It is preferred that the hardener comprises 3-20% by weight of the composition, more preferably 8-12% by weight. It is preferred that the citric acid solution comprises 2-20% by weight of the composition, more preferably 10-12% by weight. It is preferred that the aqueous carrier fluid comprises 20-30% by weight of the composition, more preferably about 24% by weight.

This sealant formulation presents several advantages. During pumping, the fluid has a very low viscosity that is not time dependent. Moreover, due to low viscosity and small particle size, the fluid can be injected into very narrow gaps. It is preferred that the composition be formulated so that it can be injected into a channel or crack narrower than about 100 micrometers. It is particularly preferred that the composition be formulated so that it can be injected into a channel or crack narrower than about 60 micrometers, thereby having better penetration ability than microcement systems.

It is preferred that the alkali-swellable material in the composition swells on contact with the cement, thus increasing the viscosity of the composition inside the crack in the cement (or another high-pH source).

When the sealant formulation is injected inside a cement crack or another void in a cement sheath, the alkali swellable materials increase the viscosity of the fluid considerably, forming a viscous mass. Then, the epoxy resin partially or completely hardens due to the presence of the hardening agent. As a result, a sealant with increased compressive strength and improved properties is obtained.

The second aspect of the invention provides a method of repairing faults or cracks in cement sheaths or plugs, thereby restoring zonal isolation. The method comprises the following steps: (i) preparing a sealant composition, (ii) injecting the composition into the crack or fault and (iii) allowing the composition to harden. The composition comprises an aqueous epoxy resin, a hardener, an alkali-swellable material (for example an ASL or hydrogel) and an aqueous carrier fluid.

Preferably, the composition further comprises a pH buffer, for example citric acid, to control the pH of the composition.

The amount of aqueous carrier fluid may be varied to provide a composition having desired rheological properties such as viscosity.

The ASL preferably has an average particle size of less than about 600 nanometers, more preferably less than 400 nanometers and most preferably less than 200 nanometers. Additionally, the ASL preferably comprises polymer chains containing acid groups.

The aqueous epoxy resin comprises a bisphenol A novalac resin, and the hardener comprises an amine hardener.

It is preferred that the alkali swellable material comprises 30-70% by weight of the composition, more preferably 40-50% by weight of the composition. It is preferred that the epoxy resin comprises 4-20% by weight of the composition, more preferably 8-12% by weight. It is preferred that the hardener comprises 3-20% by weight of the composition, more preferably 8-12% by weight. It is preferred that the citric acid solution comprises 2-20% by weight of the composition, more preferably 10-12% by weight. It is preferred that the aqueous carrier fluid comprises 20-30% by weight of the composition, more preferably about 24% by weight.

It is preferred that the alkali-swellable material in the composition swells on contact with the cement, thus increasing the viscosity of the composition inside the crack in the cement.

EXAMPLES

The following examples serve to further illustrate the invention.

Example 1

Formulations containing different amounts of the ASL, epoxy resin and a hardener were prepared. The resin EPI-REZ-5003-W-55 and the curing agent Epikure 6870-W-53 were first blended with a 0.1M citric-acid solution to lower the pH. The fluid was then blended with different amounts of ASL TYCHEM 68710-00—40% by weight for Formulation 1 and 50% by weight in Formulation 2 (Table 1). Finally, deionized water was added to adjust the fluid viscosities.

TABLE 1

| Formulation | 1 | 2 |
|---|---|---|
| TYCHEM 68710-00 (wt %) | 40 | 50 |
| EPI-REZ-5003-W-55 (wt %) | 12 | 8 |
| Epikure 6870-W-53 (wt %) | 12 | 8 |
| 0.1M Citric Acid solution (wt %) | 12 | 10 |
| Deionized water (wt %) | 24 | 24 |

Figure 2:
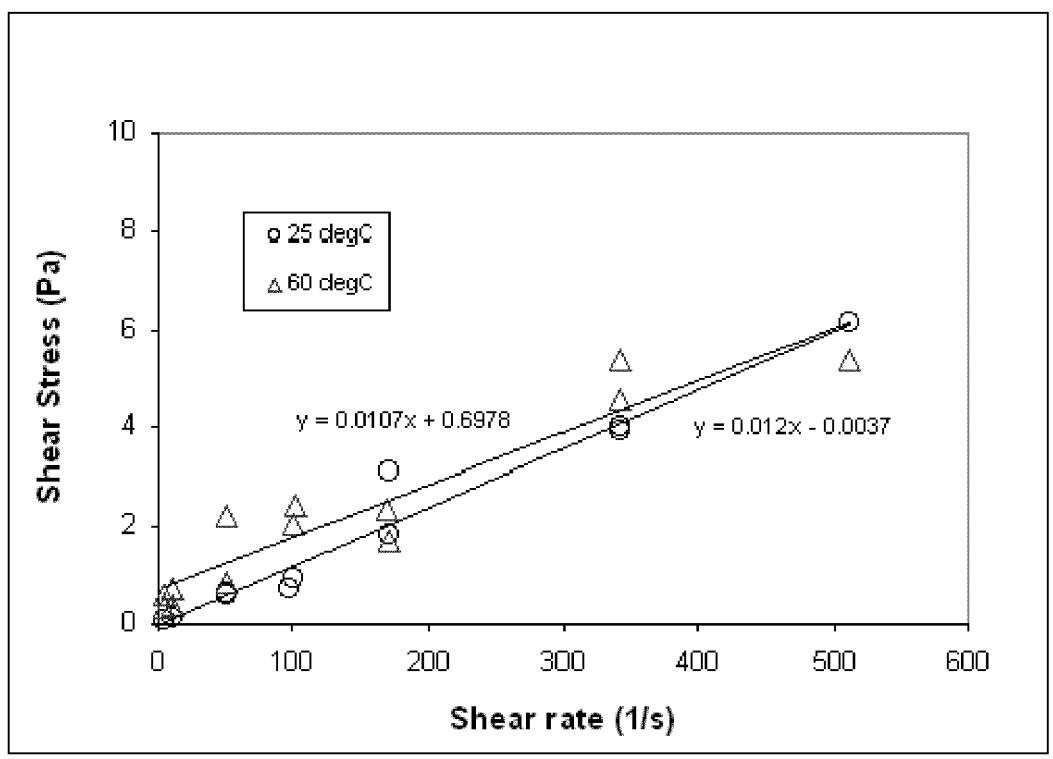

Rheological measurements were performed at 25° C. and 60° C. for both Formulations 1 and 2. The measured values of shear stress as a function of the shear rate for Formulation 1 are plotted in FIG. 1, and those for Formulation 2 are presented in FIG. 2.

Table 2 presents the plastic viscosity, PV, and the yield stress, Ty, obtained by applying the Bingham-plastic model. Measurements were performed at 25° C. and 60° C.

TABLE 2

| Temperature | 25° C. | 60° C. |
|---|---|---|
| Formulation 1 | | |
| PV (cP) | 16 | 10 |
| Ty (lbm/100 ft$^2$) | <2 | <2 |
| Formulation 2 | | |
| PV (cP) | 12 | 11 |
| Ty (lbm/100 ft$^2$) | <2 | <2 |

As can be observed, the viscosities of the ASL/resin blends are low. The values obtained are considerably lower than those of standard cement systems.

To check the stability of the fluids, in particular at higher temperatures, Formulations 1 and 2 were left to stand for 2 hours at 60° C. Rheological measurements performed after two hours showed no difference in the viscosity in this range of temperature.

Example 2

Figure 3:
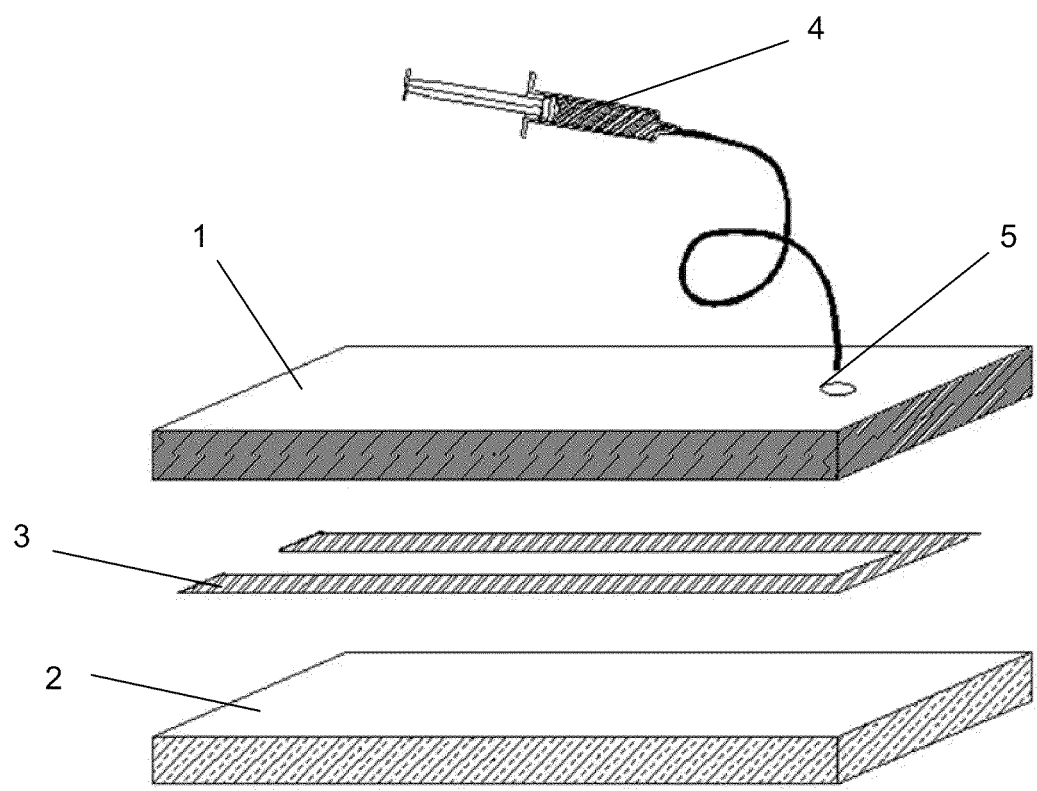
FIG. 3 shows the apparatus used to perform injection tests.

In order to test the ability of fluids containing epoxy resins and alkali swellable materials to penetrate in narrow gaps, injection tests have been performed by using a special apparatus as shown in FIG. 3.

This system is composed of a transparent Plexiglas plate (1) placed on a cement surface (2). Small clamps, not shown in the figure, are used to hold the plates together. A channel is created between the transparent plate and the cement surface by using spacers of well-defined thickness (3). The gap thickness may be adjusted to estimate the ability of the fluids to penetrate narrow fractures.

The fluid is injected in the narrow channel by a syringe pump (4) through a hole (5) in the Plexiglas plate. During the test, the injection rate is 5 mL/min. After injection, one determines the fluid's penetration ability by measuring the distance the fluid travels inside the gap. The maximum distance, defined by the size of the plates, is 23 cm. The gap height in the present tests was approximately 60 micrometers. All the tests were performed at ambient temperature.

Injection tests were performed on fluids with compositions defined by Formulation 1 and 2, described above. Both fluids were injected into channels narrower than 60 micrometers, and were able to penetrate more than 23 cm along length of the channel. When the test was performed for more than 20 minutes, the fluids began to plug the channel and the flow stopped. This showed that ASL/epoxy resin based fluids can be used to repair very narrow fractures in cement.

Example 3

Gel properties were measured after ASL/epoxy resin fluids came into contact with a basic material. A solution containing 10 wt % sodium hydroxide was mixed with the Formulation 2 fluid. The weight ratio between the basic solution and the ASL/resin fluid was 1:2. As a comparison, gels obtained by adding the same solution to the ASL TYCHEM 68710-00 were also tested.

To compare the strengths of the materials, compressive cycles were applied to the gels at ambient temperature. The force necessary to achieve a defined deformation with a flat probe was measured. The gel samples had a diameter of 2 cm, and the probe speed was 0.5 mm/s.

Figure 4:
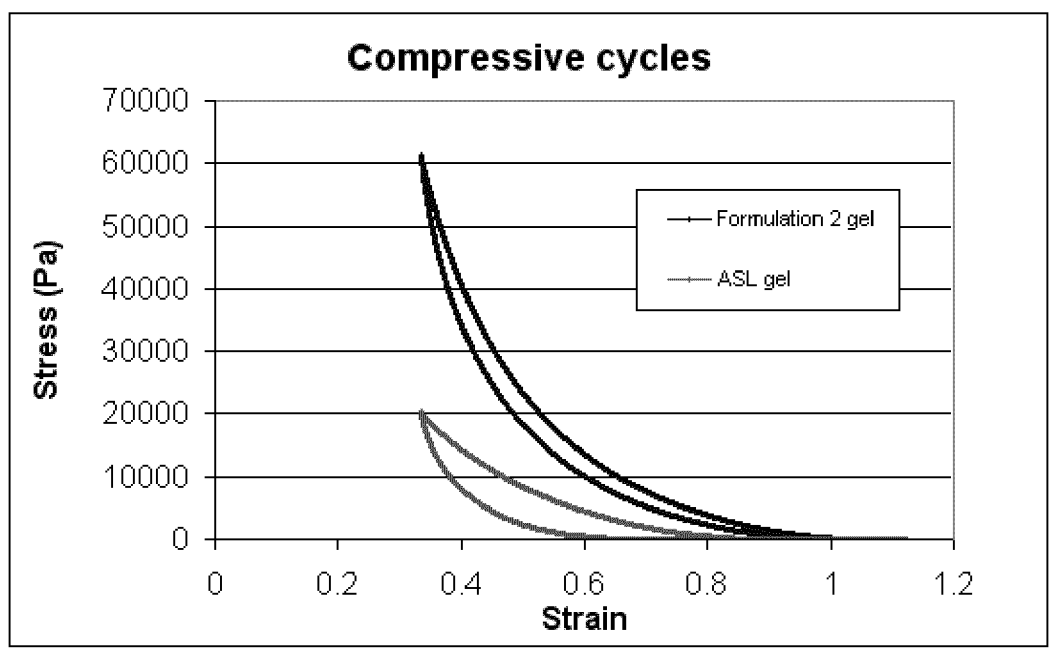
FIG. 4 is a plot showing stress as a function of strain during compressive cycles performed with two different gels.

The results, plotted in FIG. 4, show that both materials have an elastic behavior with hysteresis. However, a higher stress must be applied to the ASL/epoxy resin gel to achieve a given deformation, indicating the higher strength of the material.

Although various embodiments have been described with respect to enabling disclosures, it is to be understood that the invention is not limited to the disclosed embodiments. Variations and modifications that would occur to one of skill in the art upon reading the specification are also within the scope of the invention, which is defined in the appended claims.

The invention claimed is:

1. A method of repairing faults or cracks in cement sheaths or plugs, comprising the following steps:
   i) preparing a sealant composition comprising:
      a) an aqueous epoxy resin dispersion;
      b) a hardener;
      c) an alkali-swellable material;
      d) a pH buffer; and
      e) an aqueous carrier fluid;
   ii) injecting the composition into a crack or fault in the cement; and
   iii) allowing the composition pH to increase upon exposure to the cement, thereby causing the composition to viscosify and harden, thereby restoring zonal isolation, wherein the alkali-swellable material does not swell until the composition enters the crack or fault in the cement.

2. The method according to claim 1, wherein the size of the crack or fault is smaller than about 100 micrometers.

3. The method according to claim 1, wherein the alkali-swellable material is an alkali-swellable latex or hydrogel.

4. The method according to claim 1, wherein the pH buffer is citric acid.

5. The method according to claim 1, wherein the amount of aqueous carrier fluid is selected such that the viscosity of the composition is below about 50 cP.

6. The method according to claim 1, wherein the alkali-swellable material has an average particle size of less than about 600 nanometers.

7. The method according to claim 6, wherein the alkali-swellable material comprises polymer chains containing acid groups.

8. The method according to claim 1, wherein the aqueous epoxy resin comprises a bisphenol A novalac resin.

9. The method according to claim 1, wherein the hardener comprises an amine hardener.

10. The method according to claim 1, wherein the alkali-swellable material is present in an amount between 30-70% by weight.

11. The method according to claim 1, wherein the epoxy resin is present in an amount between 4-20% by weight.

12. The method according to claim 1, wherein the hardener is present in an amount between 3-20% by weight.

13. The method according to claim 1, wherein the aqueous carrier fluid is present in an amount between 20-30% by weight.

14. The method according to claim 1, wherein the composition comprises:
   i) 40-50 wt % alkali swellable material, wherein the alkali swellable material is an alkali swellable latex;
   ii) 8-12 wt % aqueous epoxy resin dispersion;
   iii) 8-12 wt % of the hardener, wherein the hardener is an amine hardener;
   iv) 10-12 wt % of the pH buffer, wherein the pH buffer is 0.1M citric-acid solution; and
   v) 24 wt % aqueous carrier fluid.

* * * * *